United States Patent [19]

Attanasio et al.

[11] Patent Number: 5,287,658
[45] Date of Patent: Feb. 22, 1994

[54] POLISHING MACHINE HAVING COMBINED ALTERNATING TRANSLATIONAL AND ROTATIONAL TOOL MOTION

[75] Inventors: Claude Attanasio, Chalon Sur Saone; Jean-Claude Seigue, Virey Le Grand, both of France

[73] Assignee: SEVA, Chalon Sur Saone, France

[21] Appl. No.: 75,282

[22] Filed: Jun. 11, 1993

Related U.S. Application Data

[63] Continuation of Ser. No. 889,440, May 28, 1992.

[30] Foreign Application Priority Data

Jun. 4, 1991 [FR] France .................. 9106754

[51] Int. Cl.$^5$ .......................... B24B 7/02; B24B 7/07
[52] U.S. Cl. .......................... 51/56 R; 51/59 R
[58] Field of Search .............. 51/56 R, 59 R, 54, 61, 51/64, 165.9, 34 C, 34 J, 362, 170 TL, 175; 74/49, 570

[56] References Cited

U.S. PATENT DOCUMENTS

| | | | |
|---|---|---|---|
| 327,288 | 9/1885 | Maloy | 51/59 R |
| 2,230,953 | 2/1941 | Indge | 51/120 |
| 2,288,963 | 7/1942 | Von Tavel | 74/49 |
| 2,548,979 | 4/1951 | Johnson | 51/66 |
| 2,775,128 | 12/1956 | Young | 74/49 |
| 3,019,564 | 2/1962 | Haracz | 51/56 R |
| 3,195,420 | 7/1965 | Johannsen | 74/49 |
| 3,226,888 | 1/1966 | Erenyi | 51/362 |
| 3,254,454 | 7/1966 | Centrangolo | 51/56 |
| 3,300,907 | 1/1967 | Asaeda et al. | 51/124 R |
| 3,380,198 | 4/1968 | Takada | 51/54 |
| 3,939,610 | 2/1976 | Suzuki et al. | 51/56 R |
| 4,242,837 | 1/1981 | Lohse | 51/59 R |
| 4,972,631 | 11/1990 | Schwar | 51/34 R |
| 5,110,026 | 5/1992 | Messner | 74/49 |

FOREIGN PATENT DOCUMENTS

| | | |
|---|---|---|
| 0273055 | 8/1987 | European Pat. Off. . |
| 868410 | 2/1953 | Fed. Rep. of Germany . |
| 1652119 | 9/1971 | Fed. Rep. of Germany . |
| 7314262 | 4/1973 | France . |
| 7510522 | 3/1975 | France . |
| 370269 | 4/1932 | United Kingdom ........... 51/170 TL |
| 1503274 | 3/1978 | United Kingdom . |
| 2023466 | 1/1980 | United Kingdom . |

OTHER PUBLICATIONS

Machines and Tooling, vol. 44, No. 12, 1973, Melton Mowbray GB pp. 47–48; A. P. Chernyi et al., 'Honing a Helical Surface with an Oscillating Abrasive Tool'.

*Primary Examiner*—Bruce M. Kisliuk
*Assistant Examiner*—Bryan Reichenbach
*Attorney, Agent, or Firm*—Sughrue, Mion, Zinn, Macpeak and Seas

[57] ABSTRACT

A polishing machine comprises a vertical frame 1, a workpiece-carrier plate which is horizontally movable in at least one direction, and a support column 3 vertically movable in relation to the frame and supporting a polishing unit comprising a tool holder 9 carried by a slide 41 driven in translational motion by an eccentric device operated by an electric motor 8. The tool holder thus undergoes an alternating translational or reciprocating motion, and a hydraulic jack 50 is provided to urge the tool holder against the workpiece being polished. The structure for imparting the alternating translational motion is formed by an internal connecting rod-crank assembly 34, 46 mounted in the slide 41.

8 Claims, 3 Drawing Sheets

5,287,658

POLISHING MACHINE HAVING COMBINED ALTERNATING TRANSLATIONAL AND ROTATIONAL TOOL MOTION

This is a continuation of application Ser. No. 07/889,440 filed May 28, 1992.

BACKGROUND OF THE INVENTION

This invention concerns machines for polishing objects, in particular molds designed for the manufacture of products exhibiting good surface quality.

French Patent No. 73 14 262, filed Apr. 13, 1973, describes a mold-polishing machine comprising a frame, an object-carrier plate connected to means capable of imparting to it at least one longitudinal movement of translation which is restricted by stops, and a support bearing at least one polishing unit comprising a tool holder movable in translational motion, means for imparting an alternating movement of translation to the tool holder, and presser means which press the tool holder on the object to be polished with a constant, but adjustable force.

Furthermore, Certificate of Addition No. 75 10 522 to the aforementioned patent describes a mold-polishing machine, in which the means capable of imparting a translation movement to the tool holder comprises a motor attached to the body of the polishing unit, whose freely-rotating shaft mounted in the body is connected to an eccentric which functions in conjunction with the face of a recess in the tool holder, which itself is mounted so as to travel freely in translational motion in the body.

Although machines of this kind yield very good results, the invention aims to further improve the surface quality of the articles polished using these machines.

SUMMARY OF THE INVENTION

The purpose of the invention is thus to provide a machine for polishing objects and comprising a frame, an object-carrier plate horizontally movable in at least one direction, and a support movable in relation to the frame and supporting a polishing unit comprising a tool holder borne by a slide driven in translational motion by eccentric-equipped means driven by an electric motor, in order to impart an alternating movement of translation to the tool holder, and presser means which press the tool holder on the object to be polished using a constant, but adjustable force. The machine is characterized by the fact that the means used to impart an alternating movement of translation to the tool holder comprises an internal connecting rod-crank assembly mounted in the slide.

According to another feature, the machine further incorporates means for imparting a rotating motion to the tool around its axis.

DETAILED DESCRIPTION OF THE PREFERRED EMBODIMENT

Figure 1:
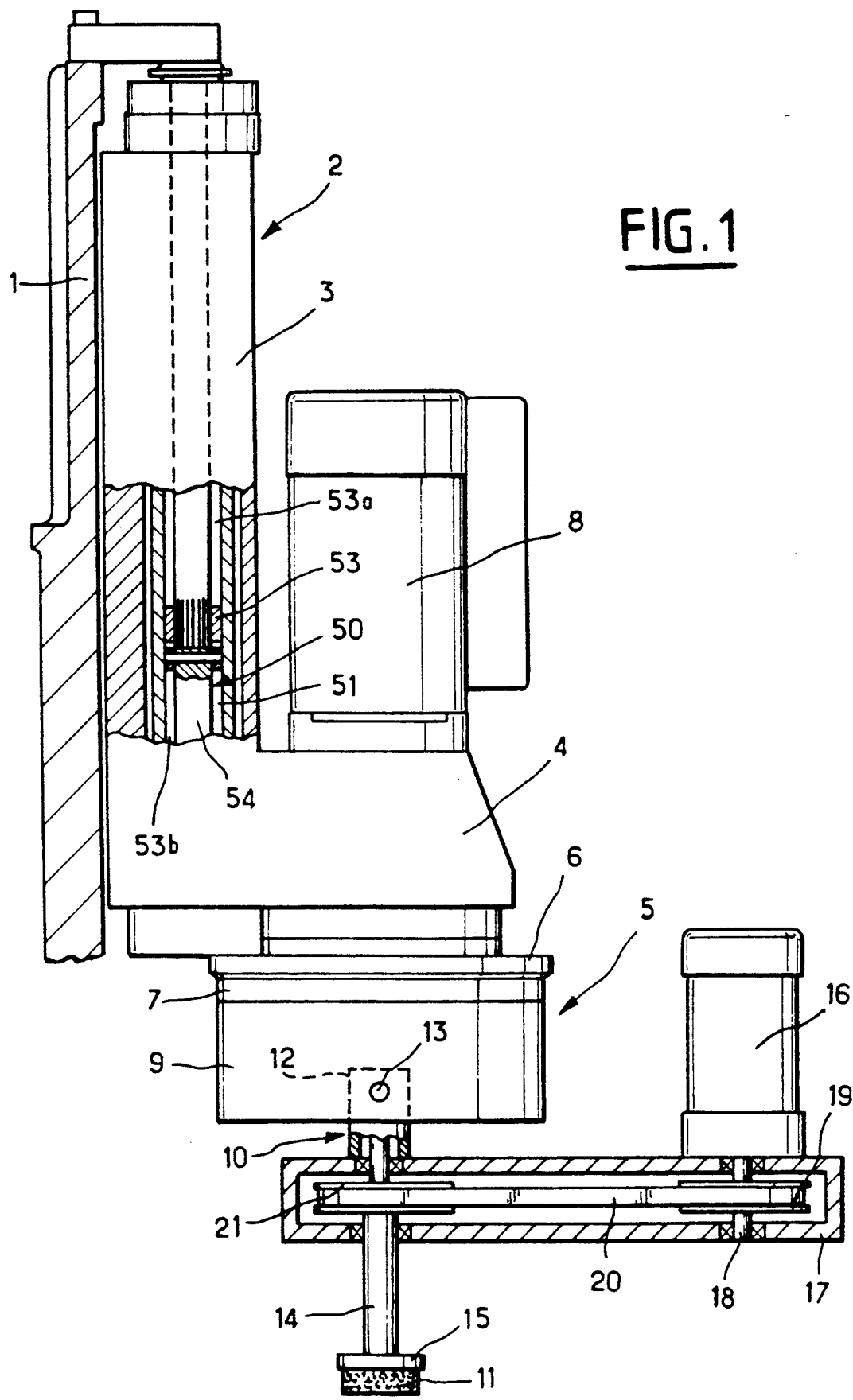
FIG. 1 is an overall schematic view of a polishing machine according to the invention.

The polishing machine shown in FIG. 1 basically comprises a vertical frame 1 on which a polishing head 2 comprising a support column 3 in the form of a square movable vertically on the frame is mounted in a sliding configuration. A vibration-activation assembly 5, comprising a carriage support 6 for a slide 7 (whose detailed construction will be described with reference to FIGS. 2 and 3) is attached to a horizontal arm 4 of the column 3.

Figure 2:
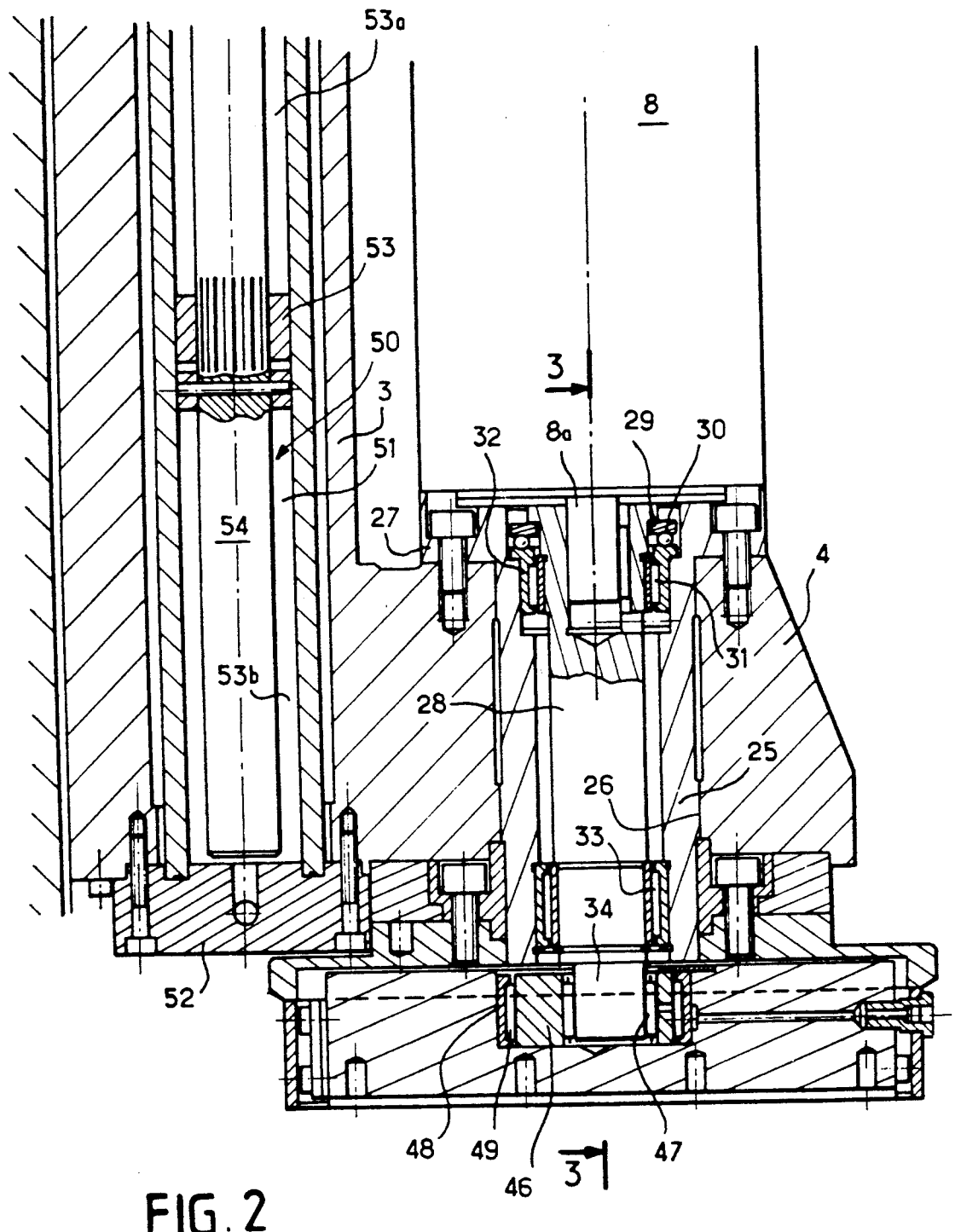
FIG. 2 is a partial elevation view in cross-section of the polishing machine in FIG. 1, whose tool holder has been removed.
Figure 3:
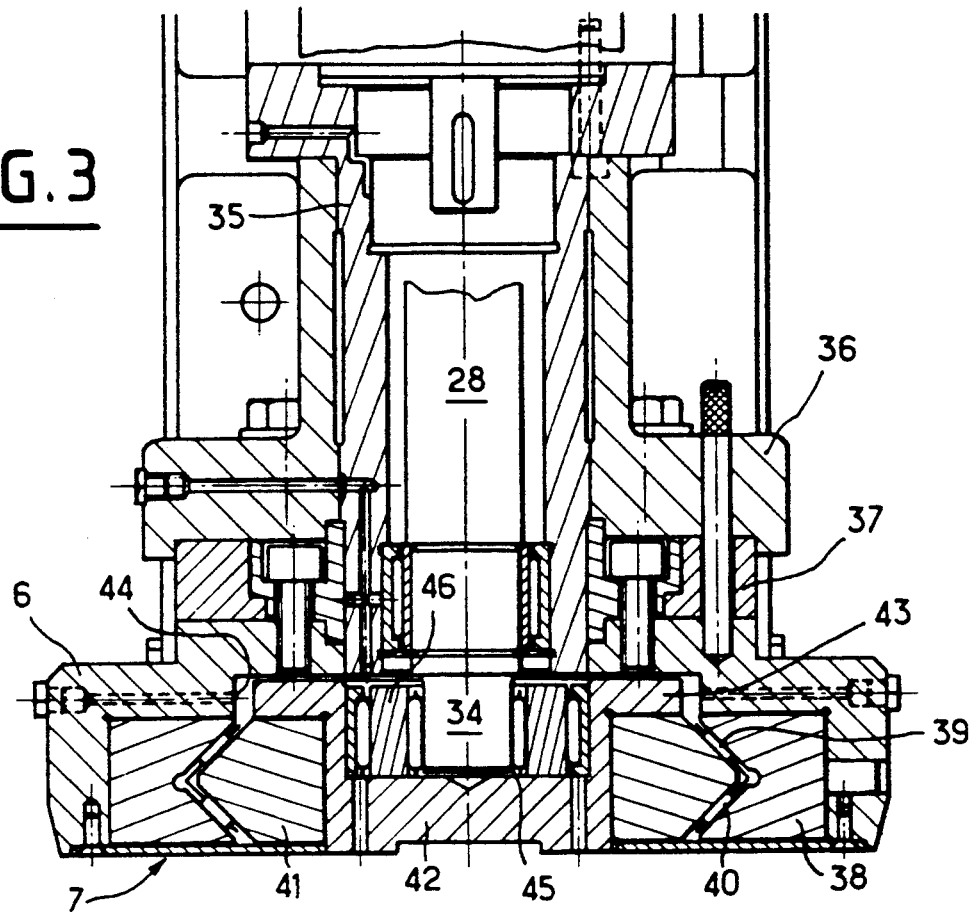
FIG. 3 is a cross-section taken along line 3—3 in FIG. 2.

An electric motor 8 which drives in rotation an internal connecting rod-crank assembly designed to impart to the slide 7 an alternating movement of translation, and whose structure will also be described in detail with reference to FIGS. 2 and 3, is positioned above the horizontal arm 4 of the column 3.

A tool holder 9, carrying a tool 10 bearing at its free end a polishing stone 11, is attached to the slide 7.

According to the preferred embodiment represented in FIG. 1, the tool 10 comprises a tail piece 12 engaged in the tool holder 9 and held in place by a screw 13. It is extended by a rotating component fitted with a mounting 15 for the stone 11 and driven in rotation by a small electric motor 16 supported in a housing 17 in which the tool shaft 14 and the output shaft 18 of the electric motor are journaled.

A pulley 19 connected by a belt 20 to a pulley 21 fastened to the shaft 14 of the tool 10 is mounted on the output shaft 18.

The construction of an eccentric-equipped device which causes the polishing machine to vibrate will now be described with reference to FIGS. 2 and 3. The electric motor 8 which drives the connecting rod-crank assembly is mounted on the horizontal arm 4 of the column 3, using a centering bushing 25 inserted in an axial bore 26 of the arm and whose upper end is fitted with a collar 27 by means of which it is attached to the horizontal arm 4 of the support column.

The output shaft of the motor 8 is formed by an actual output shaft 8a on which is wedged a cylindrical shaft 28 forming a driven shaft and whose upper end defines a shoulder 29, by means of which the cylindrical shaft rests on a thrust ball bearing 30 combined with a needle roller bearing 31, both of which are set in an axial bore incorporating a shoulder 32 in the centering bushing 25.

At the end opposite the output shaft 8a of the motor, the driven shaft 28 is mounted to rotate in the bushing 25 by means of another needle roller bearing The shaft 28 ends in an eccentric pin 34 forming a crank constituting one of the components of the internal connecting rod-crank assembly constituting the vibration-activation device of the invention.

As shown in FIG. 3, the centering bushing 25 passes through a thinned portion 35 of the horizontal arm 4 of the support 3, which ends in a flange 36 to which the carriage support 6 is attached, with the interposition of a centering ring 37.

The carriage or slide 7 is formed by a square-shaped cage 38 having two rows of angled needle rollers 39, 40 and mounted in stationary fashion in the carriage support 6, and by a carriage 41 having angled lateral walls engaging the rows of needle rollers 39, 40, and which can, accordingly, move laterally in the cage 38, parallel to FIG. 2 and perpendicular to FIG. 3.

The carriage 41 houses a member 42 adapted to receive the connecting rod-crank assembly, the member comprising a plate 43 resting on the upper wall of the carriage 41. The plate 43 is engaged, while allowing play, in a housing 44 in the carriage support 6.

The member 42 receiving the connecting rod-crank assembly has a cylindrical recessed cavity 45 in which is inserted the connecting rod-crank assembly comprising the eccentric crank pin 34 of the driven shaft 28, an eccentric ring 46 mounted around the crank pin 34 with the interposition of a needle cage 47, and an outer ring 48 surrounding the eccentric ring 46 with the interposition of a needle assembly 49. By studying FIGS. 2 and 3 in turn, it is seen that the vertical axis of the eccentric ring 46 is parallel to the axis of the driven shaft 28 and, with the axis of the driven shaft, lies in a plane parallel to the direction of motion of the carriage 41, this plane being the longitudinal plane of symmetry of the carriage as viewed in FIG. 3.

Since the carriage 41 can move only in one direction determined by the rows of needle rollers 39, 40 interposed between the carriage and the square-shaped cage 38, the rotation of the driven shaft 28 produced by the electric motor 8 causes the movement of the crank pin 34 in the manner of a crank, and, accordingly, an oscillating movement of the eccentric ring 46 in relation to the crank pin 34 and to the outer ring 48 of the assembly, thereby producing an alternating, back and forth or reciprocating translation movement of the carriage 41 whose frequency matches the angular rotation speed of the electric drive motor 8. In this configuration, the eccentric ring thus functions as a crank.

As shown in FIGS. 1 and 2, a device producing the vertical movement of the polishing head support in relation to the frame is mounted in the column 3. This motion device comprises a single-action hydraulic jack 50 in which a cylinder 51, whose lower end is sealed with a plug 52, contains a piston 53 borne by a stationary shaft 54 joined to the frame 1. Within the cylinder, the piston 53 delineates a chamber 53a designed to be fed through orifices (not shown) with a pressurized fluid. The differences in flow rates cause movement of the cylinder 51 and of the column 3 in relation to the stationary shaft 54.

It can be seen that, because of the configuration just described with reference to FIGS. 1 to 3, the polishing stone 11 is simultaneously subjected to an alternating vibratory movement because of the alternating translational motion of the carriage 7, and, furthermore, to the rotation produced by the electric drive motor 16.

Consequently, a rotating motion of the stone is obtained, which makes it possible to effect polishing passes which are much more uniform than those performed by a tool subjected either to a vibrating motion or to rotation alone. In fact, when the tool is driven only in rotation, defects are produced because of the centrifugal force caused, in particular, by the fact that the speed of the peripheral part of the tool is greater than the speed o its central part. The tool then tends to cut into the surface and to leave a peripheral mark which compromises the surface quality of the object being polished.

In the case of a combined movement of rotation and reciprocation, the tool never adopts a stationary position in relation to the object, so that the attacks to which the object is subjected by virtue of tool rotation are more even. Such combined movement of the tool also enables a higher rate of material removal, because of the rotation.

In the embodiment shown in FIG. 1, the tool 10 mounted in the tool holder 9 attached to the carriage 7 is driven in rotation. A tool of this type may, of course, be replaced by a stationary tool, which will then be subjected only to the reciprocating movements generated by the translation-activation device of the invention.

Figure 4:
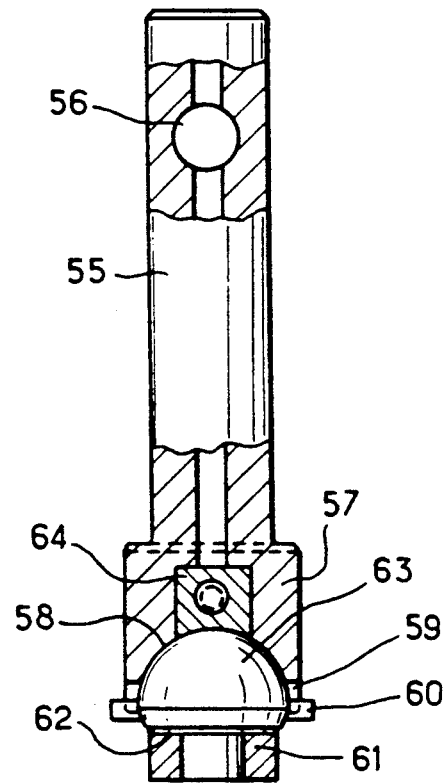
FIG. 4 is an elevation view in partial cross-section of an embodiment of a tool according to the invention.

An embodiment of this kind of tool is shown in FIG. 4. It comprises a tail piece 55, one end of which contains a transverse hole 56 for attachment of the tool in the tool holder 9 (FIG. 1). The opposite end contains a mounting 57 fitted with a housing 58 shaped like a spherical cap and with two diametrically-opposite notches 59 designed to hold trunnions or centering pieces 60 for a polishing stone 61 which, in the present embodiment, is composed of an annular component made of an abrasive material bonded on a flat surface 62 of a portion of a ball 63 made of a magnetic material, such as steel, whose outer surface matches that of the housing 58. The centering pieces 60 are carried by the stone support ball 63.

A permanent magnet 64 for holding the stone 61 in position by attracting the portion of the ball 63 to which it is attached is placed in the bottom of the housing 58 in the mounting 57. With this assembly, the stone 61 bonded to the ball 63 can oscillate around an axis delineated by the centering pieces 60 inserted in the notches 59 in the mounting, while being held in place in the housing 58 by the magnetic attraction exerted by the permanent magnet 64. The polishing stone can thus adapt or adjust to any potential irregularities in a surface to be polished, thereby conferring an important advantage in comparison with conventional polishing tools.

The annular shape of the polishing component makes it possible to obtain more uniform work, because of the elimination of the central part of the stone 61, whose rotational speed is much slower than that of its peripheral portion. Furthermore, the hollow shape of the stone facilitates the removal of the grains of material which the stone has abraded away.

In the embodiment shown in FIG. 4, the mounting 57 housing the polishing stone 61 is approximately cylindrical, but it may, of course, have a more flared shape. Moreover, a mounting incorporating a spherical cap-shaped housing and fitted with a magnet holding the stone in place, of the type described with reference to FIG. 4, may also be provided on a rotating tool of the kind described with reference to FIG. 1.

We claim:

1. A machine for polishing horizontally movable objects, comprising: a frame (1), a support column (3) movable in relation to the frame and supporting a polishing unit comprising a tool holder (9) carried by a slide (41) driven in translational motion by eccentric-equipped means driven by an electric motor (8) to impart a reciprocating translation movement to the tool holder, and presser means for pressing the tool holder against the object to be polished with a constant but adjustable force, wherein the means for imparting a reciprocating translation movement comprises an internal connecting rod-crank assembly (34, 46) mounted in the slide, wherein said machine further comprises a tool (10) mounted in the tool holder, and means (16, 19, 20, 21) coupled to said tool for continuously rotating said tool, and wherein the internal connecting rod-crank assembly comprises a crank pin (34) forming an extension on a shaft (28) driven by the electric motor (8), the crank pin cooperating with an eccentric ring (46) having an axis, relative to an outer circumference of the ring, parallel to an axis of the motor driven shaft, the eccentric ring axis undergoing reciprocating translational, back and forth movement in a plane parallel to a direction of movement of the slide, and the eccentric ring being rotatably mounted in a recessed housing (45) defined in the slide.

2. A machine according t claim 1, wherein the crank pin is mounted in the eccentric ring with the interposition of a needle bearing cage (47), and wherein the eccentric ring is rotatably mounted in the slide housing by a surrounding outer ring (48) with the interposition of a needle roller assembly (49).

3. A machine according to claim 1, wherein the tool (10) comprises a tail piece (12) fastened inside the tool holder, and a shaft (14) fitted with a mounting (15) for a polishing stone (11), the shaft being rotatably mounted in a housing (17) joined to the tail piece (12) and which supports a further electric motor (16) which drives the shaft in rotation by means of a transmission system (19, 20, 21) contained in the housing.

4. A machine according to claim 3, wherein the transmission system comprises pulleys (19, 21) attached, respectively, to the shaft (14) of the tool (10) and to an output shaft of the further electric motor, and a belt (20) connecting the pulleys.

5. A machine for polishing horizontally movable objects, comprising: a frame (1), a support column (3) movable in relation to the frame and supporting a polishing unit comprising a tool holder (9) carried by a slide (41) driven in translational motion by eccentric-equipped means driven by an electric motor (8) to impart a reciprocating translation movement to the tool holder, and presser means for pressing the tool holder against the object to be polished with a constant but adjustable force, wherein the means for imparting a reciprocating translation movement comprises an internal connecting rod-crank assembly (34, 46) mounted in the slide, and further comprising a tool mounted in the tool holder, said tool comprising an end mounting (57) fitted with a spherical cap-shaped housing (58) for receiving a polishing stone support base (63) made of a magnetic material and whose shape mates with that of the housing, a permanent magnet (64) for holding the stone support base in place and positioned in a bottom of the housing, and two diametrically-opposite notches (59) defined in the housing and receiving trunnions (60) outstanding from the stone support base to center the base in the housing.

6. A machine according to claim 5, wherein a polishing stone (61) is bonded to a flat surface (62) of the stone support base.

7. A machine according to claim 6, wherein the polishing stone is annular in shape.

8. A machine for polishing horizontally movable objects, comprising: a frame (1), a support column (3) movable in relation to the frame and supporting a polishing unit comprising a tool holder (9) carried by a slide (41) driven in translational motion by eccentric-equipped means driven by an electric motor (8) to impart a reciprocating translation movement to the tool holder, and presser means for pressing the tool holder against the object to be polished with a constant but adjustable force, wherein the means for imparting a reciprocating translation movement comprises an internal connecting rod-crank assembly (34, 46) mounted in the slide, wherein the internal connecting rod-crank assembly comprises a crank pin (34) forming an extension on a shaft (28) driven by the electric motor (8), the crank pin cooperating with an eccentric ring (46) having an axis, relative to an outer circumference of the ring, parallel to an axis of the motor driven shaft, the eccentric ring axis undergoing reciprocating translational, back and forth movement in a plane parallel to a direction of movement of the slide, and the eccentric ring being rotatably mounted in a recessed housing (45) defined in the slide, and wherein the slide (41) constitutes a carriage mounted for reciprocating translation movement in a guide roller cage (38, 39, 40) attached to a carriage support (6) in turn attached to the support column which can move vertically in relation to the frame, the carriage supporting a component (42) housing the connecting rod-crank assembly (34, 46), and the recessed housing (45) for the connecting rod-crank assembly being provided in said housing component.

* * * * *